US008767850B2

(12) United States Patent
Kim et al.

(10) Patent No.: US 8,767,850 B2
(45) Date of Patent: Jul. 1, 2014

(54) APPARATUS AND METHOD FOR ENCODING/DECODING A MULTICHANNEL SIGNAL

(75) Inventors: Mi Young Kim, Yongin-si (KR); Jung Hoe Kim, Yongin-si (KR); Hwan Shim, Yongin-si (KR); Eun Mi Oh, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/464,509

(22) Filed: May 4, 2012

(65) Prior Publication Data

US 2012/0221343 A1 Aug. 30, 2012

Related U.S. Application Data

(63) Continuation of application No. 13/257,229, filed as application No. PCT/KR2010/001698 on Mar. 18, 2010.

(30) Foreign Application Priority Data

Mar. 18, 2009 (KR) ........................ 10-2009-0023158

(51) Int. Cl.
*H04K 1/10* (2006.01)
*H04L 27/28* (2006.01)
*H04H 40/54* (2008.01)

(52) U.S. Cl.
USPC ............................................ 375/260; 381/10

(58) Field of Classification Search
USPC ............................................ 375/260; 381/10
See application file for complete search history.

(56) References Cited

U.S. PATENT DOCUMENTS

| | | | | |
|---|---|---|---|---|
| 7,756,713 | B2 * | 7/2010 | Chong et al. | 704/500 |
| 7,916,873 | B2 | 3/2011 | Villemoes et al. | |
| 2006/0133618 | A1 * | 6/2006 | Villemoes et al. | 381/20 |
| 2007/0127729 | A1 | 6/2007 | Breebaart et al. | |
| 2007/0269063 | A1 | 11/2007 | Goodwin et al. | |
| 2008/0025519 | A1 | 1/2008 | Yu et al. | |
| 2008/0031463 | A1 | 2/2008 | Davis | |
| 2008/0071549 | A1 * | 3/2008 | Chong et al. | 704/500 |
| 2008/0253576 | A1 * | 10/2008 | Choo et al. | 381/10 |

(Continued)

FOREIGN PATENT DOCUMENTS

| | | |
|---|---|---|
| CN | 1981326 | 6/2007 |
| CN | 101036183 | 9/2012 |

(Continued)

OTHER PUBLICATIONS

Breebaart, J. et al., *Parametric Coding of Stereo Audio*, EURASIP Journal on Applied Signal Processing, 2005, No. 9, pp. 1305-1322.

(Continued)

*Primary Examiner* — Shuwang Liu
*Assistant Examiner* — Nader Bolourchi
(74) *Attorney, Agent, or Firm* — Staas & Halsey LLP

(57) ABSTRACT

An apparatus for encoding/decoding a multichannel signal. The apparatus for encoding/decoding a multichannel signal processes phase parameters for phase information among a plurality of channels constituting the multichannel signal in consideration of the characteristics of the multichannel signal. The apparatus generates an encoded bit stream for the multichannel signal using the processed phase parameters and the mono signal extracted from the multichannel signal.

23 Claims, 9 Drawing Sheets

(56) References Cited

U.S. PATENT DOCUMENTS

| | | | | |
|---|---|---|---|---|
| 2009/0110201 | A1* | 4/2009 | Kim et al. | 381/2 |
| 2009/0278995 | A1* | 11/2009 | Oh | 348/731 |
| 2010/0046760 | A1 | 2/2010 | Delattre | |
| 2010/0121647 | A1* | 5/2010 | Beack et al. | 704/500 |
| 2011/0211703 | A1 | 9/2011 | Villemoes et al. | |

FOREIGN PATENT DOCUMENTS

| | | | |
|---|---|---|---|
| EP | 1 768 107 | A1 | 3/2007 |
| FR | 2911020 | | 7/2008 |
| KR | 10-2008-0093342 | | 10/2008 |
| TW | 200746873 | | 12/2007 |
| WO | 2006/048226 | | 5/2006 |

OTHER PUBLICATIONS

International Search Report, mailed Oct. 29, 2010, in International Application No. PCT/KR2010/001698 (3 pp.).

U.S. Appl. No. 13/257,229, filed Dec. 7, 2011, Kim et al., Samsung Electronics Co., Ltd.

Office Action mailed Aug. 1, 2012 in U.S. Appl. No. 13/257,229.

Chinese Office Action issued Oct. 30, 2012 in corresponding Chinese Application No. 201080022031.7.

Notice of Allowance mailed May 16, 2013 in U.S. Appl. No. 13/257,229.

Extended European Search Report mailed Oct. 30, 2013 in related European Application No. 10753719.3.

* cited by examiner (a)

(b)

(a)

(b)

APPARATUS AND METHOD FOR ENCODING/DECODING A MULTICHANNEL SIGNAL

CROSS-REFERENCE TO RELATED APPLICATIONS

This application is a continuation application of U.S. patent application Ser. No. 13/257,229 (published as US Patent Application Publication No. 2012/0069921 on Mar. 22, 2012), which claims the priority benefit of PCT/KR2010/001698 filed on Mar. 18, 2010, and which claims the priority benefit of KR-10-2009-0023158 filed on Mar. 18, 2009 in the Korean Intellectual Property Office, the disclosures of which are incorporated herein by reference.

BACKGROUND

1. Field of the Invention

Example embodiments relate to an apparatus and method for encoding/decoding a multi-channel signal, and more particularly, to an apparatus and method for encoding/decoding a multi-channel signal using phase information.

2. Description of the Related Art

Parametric Stereo (PS) technology may be used to encode a stereo signal. PS technology may generate a mono signal by down-mixing an inputted stereo signal, extract a stereo parameter indicating side information of the stereo signal, and encode the generated mono signal and the extracted stereo parameter to encode the stereo signal.

In this instance, the stereo parameter may include an Inter-channel Intensity Difference (IID) or a Channel Level Difference (CLD), an Inter-Channel Coherence or Inter-Channel Correlation (ICC), an Inter-channel Phase Difference (IPD), an Overall Phase Difference (OPD), and the like. The IID or the CLD may indicate an intensity difference depending on an energy level of at least two channel signals included in a stereo signal. The ICC may indicate a correlation between at least two channel signals depending on coherence of waveforms of the at least two channel signals included in a stereo signal. The IPD may indicate a phase difference between at least two channel signals included in a stereo signal. The OPD may indicate how a phase difference between at least two channel signals, included in a stereo signal, is distributed between two channels based on a mono signal.

SUMMARY

According to an embodiment, there is provided an encoding apparatus for a multi-channel signal, including: a parameter extraction unit to extract a plurality of parameters indicating a characteristic relation among a plurality of channels constituting a multi-channel signal; a parameter modification unit to modify a phase parameter associated with phase information between the plurality of channels, among the plurality of parameters; a parameter encoding unit to encode the plurality of parameters including the modified phase parameter; a mono signal encoding unit to encode a mono signal obtained by down-mixing the multi-channel signal; and a bitstream generation unit to generate a bitstream where the multi-channel signal is encoded, using the encoded plurality of parameters and the encoded mono signal.

The plurality of parameters may include Channel Level Differences (CLD), namely, a parameter of an energy difference among the plurality of channels. When the CLD is 0 and when an Inter-channel Phase Difference (IPD) is 180°, the parameter modification unit may modify the IPD to 0°.

According to another embodiment, there is provided an encoding apparatus for a multi-channel signal, including: a parameter extraction unit to extract a plurality of parameters indicating a characteristic relation among a plurality of channels constituting a multi-channel signal; and a parameter encoding unit to determine whether to encode a phase parameter associated with phase information between the plurality of channels among the plurality of parameters, and to encode the plurality of parameters including the phase parameter when it is determined to encode the phase parameter.

According to still another embodiment, there is provided an encoding apparatus for a multi-channel signal, including: a parameter extraction unit to extract a plurality of parameters indicating a characteristic relation among a plurality of channels constituting a multi-channel signal; a parameter encoding unit to quantize the plurality of parameters and to encode the quantized plurality of parameters; a mono signal encoding unit to encode a mono signal obtained by down-mixing the multi-channel signal; and a bitstream generation unit to generate a bitstream where the multi-channel signal is encoded, using the encoded plurality of parameters and the encoded mono signal, wherein the parameter encoding unit determines a quantization level of the phase parameter, based on a continuity of phase information among a plurality of frames included in the multi-channel signal.

According to yet another embodiment, there is provided a decoding apparatus for a multi-channel signal, including: a mono signal decoding unit to restore a mono signal from a bitstream where a multi-channel signal is encoded, the mono signal being a down-mix signal of the multi-channel signal; a parameter decoding unit to restore, from the bitstream, a plurality of parameters indicating a characteristic relation among a plurality of channels constituting the multi-channel signal; a parameter estimation unit to estimate an Overall Phase Difference (OPD), using the restored plurality of parameters, the OPD being a parameter of a phase difference between the restored mono signal and the multi-channel signal; a parameter modification unit to modify the estimated OPD; and an up-mixing unit to up-mix the mono signal using the modified OPD and the restored parameters.

The plurality of parameters may include a CLD and an IPD. The parameter modification unit may modify the OPD based on the CLD and the IPD.

According to a further embodiment, there is provided a decoding apparatus including: a parameter modification unit to modify a parameter associated with a phase difference between a multi-channel signal and a mono signal, the mono signal being a down-mix signal of the multi-channel signal; and an up-mixing unit to up-mix the mono signal using the modified parameter.

According to a further embodiment, there is provided an encoding apparatus including: a parameter extraction unit to extract a plurality of parameters indicating a characteristic relation among a plurality of channels constituting a multi-channel signal; a parameter modification unit to modify a phase parameter associated with phase information between the plurality of channels, among the plurality of parameters; a down-mixing unit to down-mix the multi-channel signal using the modified phase parameter, and to generate a mono signal; and a bitstream generation unit to generate a bitstream by encoding the generated mono signal and the plurality of parameters, other than the modified phase parameter.

According to embodiments, an apparatus and method for encoding/decoding a multi-channel signal may reduce an amount of data required for data transmission.

According to embodiments, an apparatus and method for encoding/decoding a multi-channel signal may provide a multi-channel audio signal with an improved sound quality.

Additional aspects, features, and/or advantages of example embodiments will be set forth in part in the description which follows and, in part, will be apparent from the description, or may be learned by practice of the disclosure.

DETAILED DESCRIPTION

Figure 1:
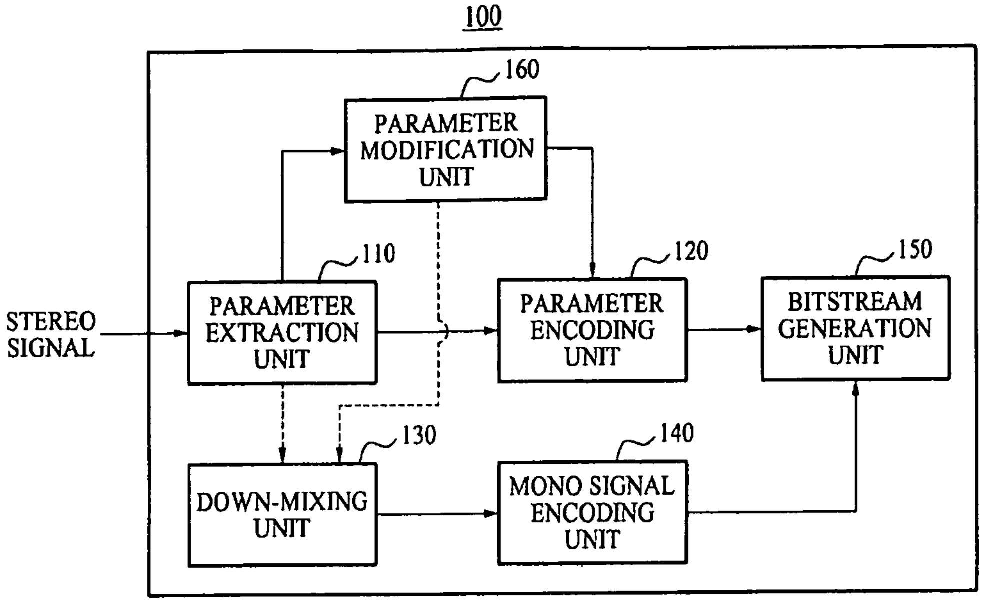
FIG. 1 is a block diagram illustrating a detailed configuration of an apparatus of encoding a multi-channel signal according to an embodiment.

Reference will now be made in detail to example embodiments, examples of which are illustrated in the accompanying drawings, wherein like reference numerals refer to the like elements throughout. Example embodiments are described below in order to explain example embodiments by referring to the figures.

FIG. 1 is a block diagram illustrating a detailed configuration of an apparatus of encoding a multi-channel signal according to an embodiment.

The apparatus 100 of encoding a multi-channel signal, hereinafter, referred to as an encoding apparatus 100, may include a parameter extraction unit 110, a parameter encoding unit 120, a down-mixing unit 130, a mono signal encoding unit 140, and a bitstream generation unit 150. The encoding apparatus 100 may further include a parameter modification unit 160. Hereinafter, functions for each of the above-mentioned components will be described.

Here, the multi-channel signal may include signals of a plurality of channels, and each of the plurality of channels included in the multi-channel signal may be referred to as a channel signal.

Hereinafter, for convenience of description, it may be assumed that the multi-channel signal input to the encoding apparatus 100 is a stereo signal including a left channel signal and a right channel signal. However, it is apparent to those skilled in the art that the encoding apparatus 100 may not be limited to encode the stereo signal, and may encode a multi-channel signal.

The parameter extraction unit 110 may extract a plurality of parameters indicating a characteristic relation between the left channel signal and right channel signal included in the stereo signal. The plurality of parameters may include a Channel Level Difference (CLD), an Inter-Channel Coherence or Inter-Channel Correlation (ICC), an Inter-channel Phase Difference (IPD), an Overall Phase Difference (OPD), and the like. Here, the IPD and the OPD may be an example of a phase parameter associated with phase information between the left channel signal and the right channel signal.

The parameter encoding unit 120 may encode the extracted plurality of parameters.

In this instance, since the OPD may be estimated from the other parameters, according to an embodiment, the parameter encoding unit 120 may encode only the CLD, the ICC, and the IPD from among the extracted plurality of parameters, and may not encode the OPD. In other words, the encoding apparatus 100 may reduce a bit amount of a transmitted bitstream, without encoding and transmitting the OPD. Estimation of the OPD will be further described with reference to an apparatus 300 of decoding a multi-channel signal of FIG. 3.

Additionally, to reduce an amount of bits allocated during encoding of the plurality of parameters, the parameter encoding unit 120 may quantize the extracted plurality of parameters, and may encode the quantized plurality of parameters. When the parameter encoding unit 120 encodes only the CLD, the ICC, and the IPD, the parameter encoding unit 120 may quantize only the CLD, the ICC, and the IPD, and may encode the quantized CLD, the quantized ICC, and the quantized IPD.

The down-mixing unit 130 may down-mix a stereo signal to output a mono signal.

The down-mixing may enable generation of a mono signal of a single channel from stereo signals of at least two channels, and a bit amount of a bitstream generated during an encoding process may be reduced through the down-mixing. Here, the mono signal may be representative of the stereo signal. In other words, the encoding apparatus 100 may encode only the mono signal and transmit the encoded mono signal, instead of encoding each of a left channel signal and a right channel signal included in the stereo signal.

For example, a magnitude of the mono signal may be obtained using an average magnitude of the left channel signal and the right channel signal, and a phase of the mono signal may be obtained using an average phase of the left channel signal and the right channel signal.

The mono signal encoding unit 140 may encode the mono signal output from the down-mixing unit 130.

As an example, when the stereo signal is a voice signal, the mono signal encoding unit 120 may encode the mono signal using a Code Excited Linear Prediction (CELP) scheme.

As another example, when the stereo signal is a music signal, the mono signal encoding unit 120 may encode the mono signal using a method similar to an existing Moving Picture Experts Group (MPEG)-2/4 Advanced Audio Coding (AAC) or an MPEG Audio-Layer 3 (mp3).

The bitstream generation unit 150 may generate a bitstream where the stereo signal is encoded, using the encoded plurality of parameters and the encoded mono signal.

As described above, to reduce an amount of bits to be transmitted, the encoding apparatus 100 may extract, from a stereo signal, a mono signal and a plurality of parameters, may encode the extracted mono signal and the extracted plurality of parameters, and may transmit the encoded mono signal and the encoded plurality of parameters. Additionally, to further reduce the amount of bits used for transmission of the plurality of parameters, the encoding apparatus 100 may encode only a CLD, an ICC, and an IPD, among the extracted plurality of parameters, excluding an OPD, and may transmit the encoded CLD, the encoded ICC, and the encoded IPD.

However, since the stereo signal itself is not encoded and transmitted, a sound quality of the stereo signal may be degraded when the stereo signal is played back. Accordingly, there is a need for a method that may reduce the amount of bits to be transmitted while minimizing degradation in the sound quality. Hereinafter, embodiments of an operation of the encoding apparatus 100 to reduce the degradation in the sound quality will be described. Dotted arrows in FIG. 1 may be used to describe an encoding apparatus 100 for a multi-channel signal according to another embodiment. The encoding apparatus 100 according to another embodiment will be further described later.

1. Modification of Phase Parameter Indicating Phase Information Between left Channel Signal and right Channel Signal As described above, when the encoding apparatus 100 encodes only the CLD, the ICC, and the IPD among the plurality of parameters, and transmits the encoded CLD, the encoded ICC, and the encoded IPD to a decoding end, the decoding end may estimate an OPD using the CLD and IPD. Here, when the estimated OPD is rapidly changed in consecutive frames, undesired noise may occur. Hereinafter, a concept of noise occurring due to a change of a phase parameter will be further described with reference to FIG. 2.

Figure 2:
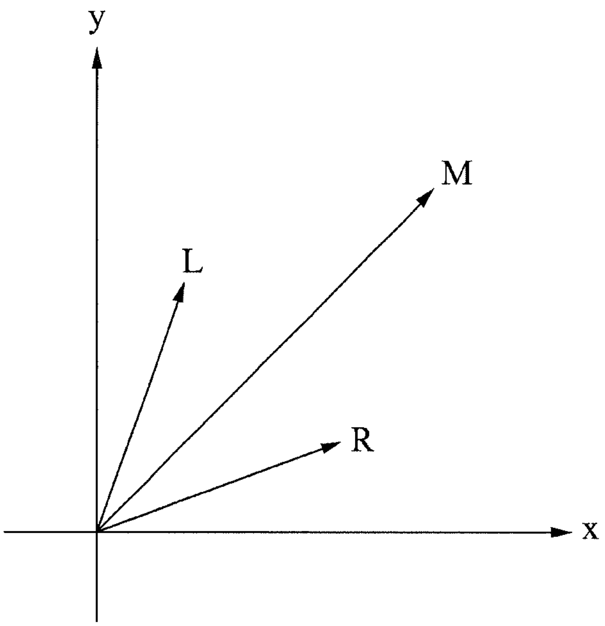
FIG. 2 is a diagram used for describing a concept of a change of a phase parameter in consecutive frames included in a stereo signal.
Figure 2:
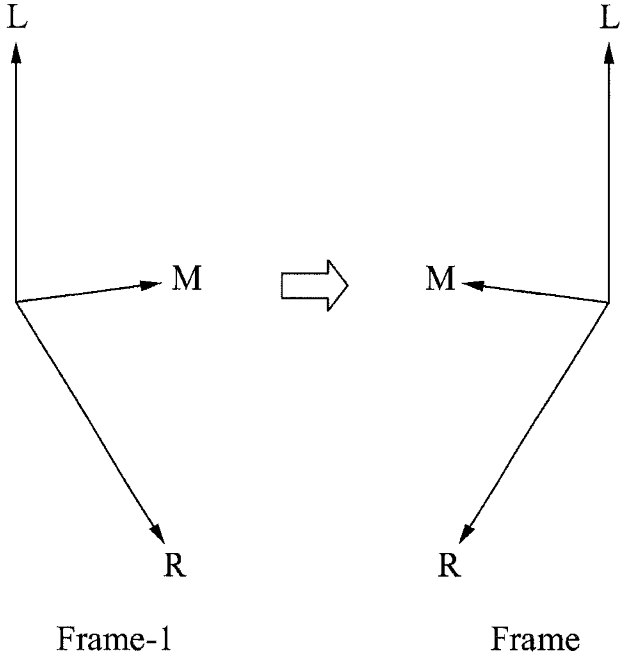

FIG. 2 is a diagram used for describing a concept of a change of a phase parameter in consecutive frames included in a stereo signal.

FIG. 2(*a*) illustrates a relationship among phase parameters (IPD and OPD), a left channel signal, a right channel signal, and a mono signal. Here, "L" denotes a left channel signal in a frequency domain, "R" denotes a right channel signal in a frequency domain, and "M" denotes a down-mixed mono signal. The IPD and OPD may be computed using Equations 1 and 2.

$$IPD=\angle(L\cdot R^*) \qquad \text{[Equation 1]}$$

Here, L·R denotes a dot product of the left channel signal and the right channel signal, IPD denotes an angle formed by the left channel signal and the right channel signal, and * denotes a complex conjugate.

$$OPD=\angle(L\cdot M^*) \qquad \text{[Equation 2]}$$

Here, L·M denotes a dot product of the left channel signal and the mono signal, OPD denotes an angle formed by the left channel signal and the mono signal, and * denotes a complex conjugate.

FIG. 2(*b*) illustrates an example in which phase parameters (IPD and OPD) are rapidly changed in consecutive frames.

In FIG. 2(*b*), "Frame" indicates a current frame, and "Frame-1" indicates a frame prior by one frame to the current frame (hereinafter, referred to as a "previous frame").

As shown in FIG. 2(*b*), when the IPD is changed around 180° in the previous frame and the current frame, the IPD may vary greatly from 180° to −180° based on the left channel signal, and accordingly, the OPD may rapidly vary from 90° to −90° based on the left channel signal. Due to the changes in the IPD and the OPD, undesired noise may occur during playback of the stereo signal. Accordingly, to reduce noise occurring during playback of the stereo signal, and to improve the sound quality of the stereo signal, a phase parameter associated with phase information between the left channel signal and the right channel signal needs to be modified.

Accordingly, the encoding apparatus 100 may modify a phase parameter extracted by the parameter extraction unit 110, and may control a level of a change of the phase parameter in consecutive frames, so that the noise occurring in playback of the stereo signal may be reduced. Here, the modification of the parameter may be performed by the parameter modification unit 160 included in the encoding apparatus 100.

For example, when the CLD is 0 and when the IPD is 180°, the parameter modification unit 160 may modify the IPD to 0°. In other words, when there is no difference in energy between the left channel signal and the right channel signal, and when an angle between the left channel signal and the right channel signal is 180°, the IPD may be forced to be set to 0°.

In other words, when the IPD is continuously changed in the vicinity of 180° as illustrated in FIG. 2(*b*), the encoding apparatus 100 may modify the IPD to 0° at a time at which the IPD becomes 180°, may encode the modified IPD, and may transmit the encoded IPD to a decoding end. Here, an OPD estimated by the decoding end may be changed to 90°, 0°, and −90° in sequence, rather than being changed from 90° to −90°, and accordingly it is possible to prevent phase information generated during decoding of the stereo signal from being rapidly changed.

2. Selective Encoding of Phase Parameter

As described above, to reduce the amount of bits allocated during encoding of a plurality of parameters, the encoding apparatus 100 may quantize the extracted plurality of parameters (in particular, the phase parameter), encode the quantized plurality of parameters, and transmit the encoded plurality of parameters to a decoding end.

However, in an example in which phase information continues to be changed in consecutive frames included in a stereo signal (that is, when the level of change in phase parameter is low), when the decoding end restores the stereo signal using the phase parameter and plays back the restored stereo signal, the sound quality may be degraded due to quantization of the phase parameter and a discontinuous phase value caused by the quantization of the phase parameter.

Accordingly, the encoding apparatus 100 according to an embodiment may determine whether to encode the phase parameter, based on the level of change (continuity) in phase information among a plurality of frames included in the stereo signal. In other words, when it is determined that the phase information among the plurality of frames in the stereo signal is continuous, the phase information may not be encoded. When it is determined that the phase information is discontinuous, the phase information may be encoded. In this case, whether to encode the phase parameter may be determined by the parameter encoding unit 120.

According to an embodiment, the parameter encoding unit 120 may determine the continuity of the phase information, using a phase information value of a current frame, a phase information value of a previous frame prior by one frame to the current frame, and a phase information value of a previous frame prior by two frames to the current frame. In other words, the parameter encoding unit 110 may determine the continuity of phase information in an n-th frame, using a phase information value of the n-th frame, a phase information value of an (n−1)-th frame, and a phase information value of an (n−2)-th frame.

As an example, the parameter encoding unit 120 may compute a first phase difference value and a second phase difference value. Here, the first phase difference value may correspond to a difference between a value, twice a phase information value of a previous frame prior by one frame to a current frame, and a phase information value of a previous frame prior by two frames to the current frame. Further, the second phase difference value may correspond to a difference between the first phase difference value and a phase information value of the current frame. When the second phase difference value is greater than a preset value, the parameter encoding unit 120 may verify that the phase information is discontinuous (that is, verify that the phase information is not changed slowly), and may determine to encode the phase parameter, which will be expressed by Equation 3 below.

PhaseError[band]=Phase[band]−(2·PhasePrev[band]−PhasePrev2[band]) [Equation 3]

Here, Phase[ ] denotes a phase information value of a current frame, PhasePrev[ ] denotes a phase information value of a previous frame prior by one frame to the current frame, PhasePrev2[ ] denotes a phase information value of a previous frame prior by two frames to the current frame, PhaseError[ ] denotes a second phase difference value, and band denotes a frequency band where phase information is applied.

When PhaseError[band] is greater than a preset value, the parameter encoding unit 120 may determine to encode the phase information. When PhaseError[band] is equal to or less than the preset value, the parameter encoding unit 120 may determine not to encode the phase information.

According to another embodiment, the parameter encoding unit 120 may determine whether the phase information is continuous, using a difference between the phase information value of the current frame and the phase information value of the previous frame prior by one frame to the current frame, and may determine whether to encode the phase parameter depending on whether the phase information is continuous.

As an example, the parameter encoding unit may calculate a difference between a phase information value of a current frame and a phase information value of a previous frame prior by one frame to the current frame, compute a slope of the difference, and determine whether the phase information is continuous, based on Equation 4.

Slope[band]=Phase[band]−PhasePrev[band] [Equation 4]

In this case, Slope[ ] denotes a difference between a phase information value of a current frame and a phase information value of a previous frame prior by one frame to the current frame, and band denotes a frequency band where the phase information is applied.

When Slope[band] is changed to be greater than a constant slope, noise may occur by discontinuity of the phase information due to quantization. Accordingly, when the slope of slope[band] is greater than a preset value, the parameter encoding unit 120 may determine not to encode the phase information. When the slope of Slope[band] is equal to or less than the preset value, the parameter encoding unit 120 may determine to encode the phase information.

When computing Equations 3 and 4, the parameter encoding unit 120 may compute the first phase difference value, the second phase difference value, and a phase difference value between the current frame and the previous frame prior by one frame to the current frame, based on a wrapping property that the phase information continues to change based on 360°. For example, when the phase difference value is 370°, the parameter encoding unit 120 may compute the phase difference value as −10° based on a period of 360°.

According to another embodiment, the parameter encoding unit 120 may combine PhaseError[band] and Slope[band], and may determine whether to encode the phase information.

Additionally, the parameter encoding unit 120 may determine whether to encode the phase parameter (more accurately, an IPD included in the phase parameter), based on an ICC value extracted by the parameter extraction unit 110, in addition to the continuity of the phase information.

The parameter extraction unit 110 may extract the ICC using the IPD, or extract the ICC without using the IPD. For example, when a difference between an ICC extracted using an IPD and an ICC extracted without using the IPD is greater than a preset value, the IPD may be interpreted to be more significant than the ICC during decoding of the stereo signal. Conversely, when the difference between the ICC extracted using the IPD and the ICC extracted without using the IPD is less than the preset value, the ICC may be interpreted to be more significant than the IPD during decoding of the stereo signal.

As a result, according to an embodiment, when a difference between an ICC extracted based on the IPD and an ICC extracted regardless of the IPD is greater than the preset value, the parameter encoding unit 120 may determine to encode the IPD.

In this instance, the encoding apparatus 100 may encode the IPD, and an IPD-based ICC, and may transmit the encoded IPD and the encoded IPD-based ICC to a decoding end. The decoding end may restore a stereo signal using the IPD and the IPD-based ICC, so that the restored stereo signal may be similar to the original sound.

In other words, during decoding of the stereo signal, the decoding end may adjust a mixing level of a decorrelated signal and a restored mono signal. Here, the decorrelated signal may correspond to a vertical vector component of the mono signal restored using the ICC. Accordingly, when the stereo signal is restored using the IPD-based ICC in the decoding end, the decoding end may prevent both the decorrelated signal and the restored mono signal from being excessively mixed due to a difference in phase information, so that the stereo signal may be restored to be similar to the original sound.

As an example, the parameter extraction unit 120 may extract the IPD-based ICC, using Equation 5.

$$ICC_{band} = \frac{\mathrm{Re}\{L \cdot R^* \cdot e^{-iIPD_{band}}\}}{|L| \cdot |R|} \quad \text{[Equation 5]}$$

Specifically, a correlation between the left channel signal and the right channel signal may be calculated by compensating for the phase information, and the IPD-based ICC may be computed by acquiring only a real number from the calculated correlation.

As another example, the parameter extraction unit 120 may extract the IPD-based ICC, using Equation 6.

$$ICC_{band} = \frac{\mathrm{Re}\{L \cdot R^* \cdot e^{-iQ^{-1}(Q(IPD_{band}))}\}}{|L| \cdot |R|} \quad \text{[Equation 6]}$$

In this case, Q denotes quantization, and $Q^{-1}$ denotes inverse-quantization.

Specifically, when a decoding end restores a stereo signal using an ICC extracted based on Equation 6, an error caused by quantization of the phase parameter may be corrected.

As still another example, the parameter extraction unit 120 may extract the IPD-based ICC, using Equation 7.

$$ICC_{band} = \frac{|L \cdot R^* \cdot e^{-iIPD_{band}}|}{|L| \cdot |R|} \quad \text{[Equation 7]}$$

3. Selective Change of Quantization Scheme of Phase Parameter

As described above, the encoding apparatus 100 may encode the quantized phase parameter, and may transmit the encoded phase parameter to the decoding end. For example, when the phase parameter is encoded and transmitted to the decoding end uniformly, not selectively, the encoding apparatus 100 may selectively change a quantization scheme to prevent the sound quality from being degraded due to the quantized phase parameter.

In other words, when the phase parameter is quantized in a wide interval, despite a low change level of phase information (that is, even when the phase information is continuously changed), the sound quality of the stereo signal played back in the decoding end may be degraded due to a discontinuous phase value. Accordingly, the encoding apparatus 100 according to an embodiment may determine a quantization type of the phase parameter based on continuity of the phase information. Here, the quantization type may be determined by the parameter encoding unit 120.

Specifically, when it is determined that the phase information is discontinuous, the parameter encoding unit 120 may quantize the phase parameter based on a first quantization type. When it is determined that the phase information is continuous, the parameter encoding unit 120 may quantize the phase parameter based on a second quantization type.

In this instance, a number of quantization levels based on the first quantization type may be different from a number of quantization levels based on the second quantization type.

Additionally, a representative value in the quantization levels based on the first quantization type (that is, a value quantized in the quantization levels) may be different from a representative value in the quantization levels based on the second quantization type.

Accordingly, a quantization error based on the first quantization type may be different from a quantization error based on the second quantization type. Here, the quantization error may refer to a difference value between a quantized value and a non-quantized value.

As an example, the parameter encoding unit 120 may quantize the phase parameter in a finer interval, compared to discontinuous phase information, and may minimize degradation in the sound quality of the stereo signal in the decoding end. In this example, the number of quantization levels of the first quantization type may be less than the number of quantization levels of the second quantization type.

Additionally, whether the phase information is continuous may be determined based on Equation 3 and Equation 4.

For example, when the parameter encoding unit 120 encodes the phase parameter by selectively applying quantization types, the bitstream generation unit 150 may generate a bitstream by further using determined quantization type information. In this example, a decoding end to which the bitstream is received may perform inverse-quantization based on the quantization type information. When the encoding apparatus 100 does not transmit the phase information to the decoding end, the bitstream generation unit 150 may not include the quantization type information in the bitstream, and the decoding end to which the bitstream without the quantization type information is received may perform inverse-quantization without referring to the quantization type information. A further description of the inverse-quantization performed by the decoding end will be made with reference to descriptions of an apparatus 300 of decoding a multi-channel signal of FIG. 3.

Tables 1 and 2 respectively show quantization angle information in an example of 8 quantization levels of the first quantization type, and quantization angle information in an example of 16 quantization levels of the second quantization type.

TABLE 1

| Index | Angle |
|---|---|
| 0 | 0 |
| 1 | 45 |
| 2 | 90 |
| 3 | 135 |
| 4 | 180 |
| 5 | 225 |
| 6 | 270 |
| 7 | 315 |

TABLE 2

| Index | Angle |
|---|---|
| 0 | 0 |
| 1 | 22.5 |
| 2 | 45 |
| 3 | 67.5 |
| 4 | 90 |
| 5 | 112.5 |
| 6 | 135 |
| 7 | 157.5 |
| 8 | 180 |
| 9 | 202.5 |
| 10 | 225 |
| 11 | 247.5 |
| 12 | 270 |
| 13 | 292.5 |
| 14 | 315 |
| 15 | 337.5 |

The embodiments of the operation of the encoding apparatus 100 to reduce the bit amount of the bitstream to be transmitted, and to reduce the degradation in the sound quality have been described above. Hereinafter, an apparatus of decoding a multi-channel signal according to an embodiment will be described with reference to FIG. 3.

Figure 3:
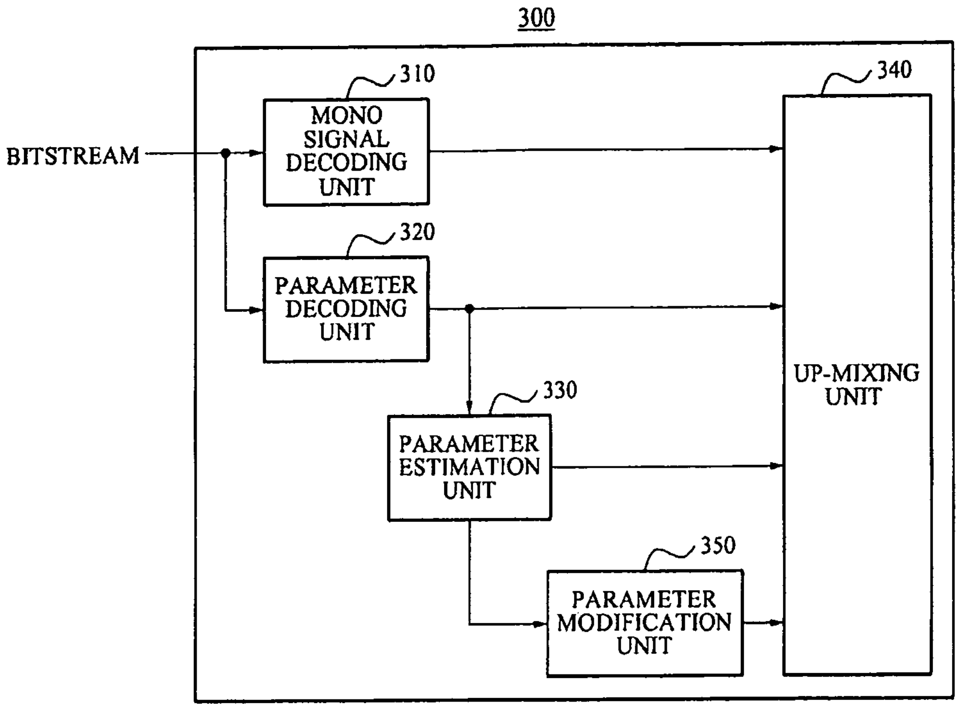
FIG. 3 is a block diagram illustrating a detailed configuration of an apparatus of decoding a multi-channel signal according to an embodiment.

FIG. 3 is a block diagram illustrating a detailed configuration of an apparatus of decoding a multi-channel signal according to an embodiment.

The apparatus 300 of decoding a multi-channel signal, hereinafter, referred to as a decoding apparatus 300, may include a mono signal decoding unit 310, a parameter decoding unit 320, a parameter estimation unit 330, an up-mixing unit 340, and a parameter modification unit 350. Hereinafter, functions for each the above-mentioned components will be described.

Hereinafter, for convenience of description, it may be assumed that a bitstream input to the decoding apparatus 300 is a bitstream where a stereo signal is encoded.

Additionally, it may be assumed that the input bitstream is demultiplexed into an encoded mono signal and an encoded plurality of parameters.

The mono signal decoding unit 310 may restore a mono signal from the bitstream where the stereo signal is encoded. Here, the mono signal may be a down-mix signal of the multi-channel signal. Specifically, when the mono signal is encoded in a time domain, the mono signal decoding unit 310 may decode the encoded mono signal in the time domain, and when the mono signal is encoded in a frequency domain, the mono signal decoding unit 310 may decode the encoded mono signal in the frequency domain.

The parameter decoding unit 320 may restore, from the bitstream, a plurality of parameters indicating a characteristic relation among a plurality of channels constituting the multichannel signals. Here, the plurality of parameters may include a CLD, an ICC, and an IPD, however, may exclude an OPD.

The parameter estimation unit 330 may estimate the OPD using the restored plurality of parameters.

Hereinafter, an operation of the parameter estimation unit 330 to estimate the OPD will be further described. Here, it is apparent to those skilled in the related art that equations described below may be merely an example and that a modification of each of the equations is possible.

The parameter estimation unit 330 may obtain a first intermediate variable c using the CLD based on Equation 8.

$$c(b) = 10^{\frac{CLD(b)}{20}} \quad \text{[Equation 8]}$$

Here, b denotes an index of a frequency band. In Equation 8, the first intermediate variable c may be obtained by expressing, as an exponent of 10, a value obtained by dividing a value of an Inter-channel Intensity Difference (IID) in a predetermined frequency band by 20. Additionally, using the first intermediate variable c, a second intermediate variable $c_1$ and a third intermediate variable $c_2$ may be obtained, as given in Equations 9 and 10.

$$c_1(b) = \frac{\sqrt{2}}{\sqrt{1 + c^2(b)}} \quad \text{[Equation 9]}$$

$$c_2(b) = \frac{\sqrt{2}\, c(b)}{\sqrt{1 + c^2(b)}} \quad \text{[Equation 10]}$$

Specifically, the third intermediate variable $c_2$ may be obtained by multiplying the second intermediate variable $c_1$ by the first intermediate variable c.

Next, the parameter estimation unit 330 may obtain a first right channel signal and a first left channel signal, using the restored mono signal, and the second intermediate variable and the third intermediate variable that are respectively obtained by Equations 9 and 10. The first right channel signal and the first left channel signal may be represented by Equations 11 and 12, respectively.

$$\hat{R}_{n,k} = c_1 M_{n,k} \quad \text{[Equation 11]}$$

Here, n denotes a time slot index, and k denotes a parameter band index. The first right channel signal $\hat{R}_{n,k}$ may be represented as a multiplication of the second intermediate variable $c_1$ and the restored mono signal M.

$$\hat{L}_{n,k} = c_2 M_{n,k} \quad \text{[Equation 12]}$$

Here, the first left channel signal $\hat{L}_{n,k}$ may be represented as a multiplication of the second intermediate variable $c_2$ and the restored mono signal M.

When an IPD is denoted as $\phi$, a first mono signal $\hat{M}_{n,k}$ may be represented using the first right channel signal $\hat{R}_{n,k}$ and the second left channel signal $\hat{L}_{n,k}$, as given in Equation 13.

$$|\hat{M}_{n,k}| = \sqrt{|\hat{L}_{n,k}|^2 + |\hat{R}_{n,k}|^2 - 2|\hat{L}_{n,k}||\hat{R}_{n,k}|\cos(\pi - \phi)} \quad \text{[Equation 13]}$$

Additionally, using Equations 10 through 13, a fourth intermediate variable p based on a time slot and a parameter band may be obtained, as given in Equation 14.

$$p_{n,k} = \frac{|\hat{L}_{n,k}| + |\hat{R}_{n,k}| + |\hat{M}_{n,k}|}{2} \quad \text{[Equation 14]}$$

Here, the fourth intermediate variable p may be obtained by dividing, by 2, a sum of magnitudes of the first left channel signal, the first right channel signal, and the first mono signal. In this case, when a value of the OPD is denoted as $\phi_1$, the OPD may be obtained, as given in Equation 15.

$$\varphi_1 = 2\arctan\left(\sqrt{\frac{(p_{n,k} - |\hat{L}_{n,k}|)(p_{n,k} - |\hat{M}_{n,k}|)}{p_{n,k}(p_{n,k} - |\hat{R}_{n,k}|)}}\right) \quad \text{[Equation 15]}$$

Additionally, when a value corresponding to a difference between the OPD and the IPD is denoted as $\phi_2$, $\phi_2$ may be obtained, as given in Equation 16.

$$\varphi_2 = 2\arctan\left(\sqrt{\frac{(p_{n,k} - |\hat{R}_{n,k}|)(p_{n,k} - |\hat{M}_{n,k}|)}{p_{n,k}(p_{n,k} - |\hat{L}_{n,k}|)}}\right) \quad \text{[Equation 16]}$$

The OPD value $\phi_1$ obtained by Equation 15 may represent a phase difference between the encoded mono signal and the left channel signal to be up-mixed. The value $\phi_2$ obtained by Equation 16 may represent a phase difference between the encoded mono signal and the right channel signal to be up-mixed.

Accordingly, the parameter estimation unit 330 may generate, from the restored mono signal, the first left channel signal and the first right channel signal with respect to the left channel signal and the right channel signal, using an IID indicating an inter-channel intensity difference of stereo signals, may generate the first mono signal from the first left channel signal and the first right channel signal, using an IPD indicating an inter-channel phase difference of stereo signals, and may estimate a value of an OPD indicating a phase difference between the restored mono signal and the stereo signal, using the generated first left channel signal, the generated first right channel signal, and the generated first mono signal.

The up-mixing unit 340 may up-mix the mono signal using at least one restored parameter and the estimated OPD.

The up-mixing may enable generation of stereo signals of at least two channels from mono signals of a single channel, and may be converse to the down-mixing. Hereinafter, operations of the up-mixing unit 340 to up-mix the mono signal using the CLD, the ICC, the IPD, and the OPD will be further described.

When a value of the ICC is $\rho$, the up-mixing unit 340 may obtain a first phase $\alpha+\beta$ and a second phase $\alpha-\beta$ using the second intermediate variable $c_1$ and the third intermediate variable $c_2$, as given in Equations 17 and 18.

$$\alpha + \beta = \frac{1}{2}\arccos\rho \cdot \left(1 + \frac{c_1 - c_2}{\sqrt{2}}\right) \quad \text{[Equation 17]}$$

$$\alpha - \beta = \frac{1}{2}\arccos\rho \cdot \left(1 - \frac{c_1 - c_2}{\sqrt{2}}\right) \quad \text{[Equation 18]}$$

Subsequently, when the restored mono signal is denoted by M and when the decorrelated signal is denoted by D, the up-mixing unit 340 may obtain an up-mixed left channel signal, L', and an up-mixed right channel signal, R', as given in the following Equations 19 and 20, using the first phase, the second phase, the second intermediate variable $c_1$ and the third intermediate variable $c_2$, obtained by Equations 18 and 19, using the OPD value $\phi_1$ obtained by Equation 15, and the value $\phi_2$ obtained by Equation 16.

$$L' = (M\cdot\cos(\alpha+\beta) + D\cdot\sin(\alpha+\beta))\cdot\exp(j\phi_1)\cdot c_2 \quad \text{[Equation 19]}$$

$$R' = (M\cdot\cos(\alpha-\beta) - D\cdot\sin(\alpha-\beta))\cdot\exp(j\phi_2)\cdot c_1 \quad \text{[Equation 20]}$$

As described above, the decoding apparatus 300 may estimate the OPD value using the other parameters transmitted from an encoding end, and may restore a stereo signal using the estimated OPD parameter and the other parameters.

However, as described with reference to FIG. 2, when the OPD estimated using the transmitted parameters is rapidly changed in consecutive frames, noise may occur, which may result in degradation in sound quality. Accordingly, when an encoding end transmits a phase parameter without modifying the phase parameter, the decoding apparatus 300 may modify the phase parameter, to reduce the noise.

Accordingly, the decoding apparatus 300 may modify the estimated OPD, and may restore the stereo signal using the modified OPD and the restored plurality of parameters.

When the restored plurality of parameters include a CLD and an IPD, the decoding apparatus 300 may modify the OPD based on the CLD and the IPD. Here, a parameter modification may be performed by the parameter modification unit 350.

As an example, when the restored IPD is 180°, the parameter modification unit 350 may modify the estimated OPD to 0°.

As another example, when the restored IPD is not 180°, the parameter modification unit 350 may modify the estimated OPD using the CLD. In this example, the modified OPD may correspond to either a value between the restored OPD and 0°, or a value between the restored OPD and −180°.

In other words, when the restored IPD is changed in the vicinity of 180°, the estimated OPD may be rapidly changed from about 90° to about −90°. To prevent the rapid change in the OPD, the parameter modification unit 330 may set the OPD to 0° when the IPD is 180°. When the IPD has a value in the vicinity of 180°, the OPD may be set to either a value between 90° and 0° or a value between −90° and 0°, for example either 67.5° or −67.5°. Accordingly, the OPD may be changed to 67.5°, 0°, and −67.5° in sequence, instead of being changed from 90° to −90°, and thus it is possible to prevent the phase information from being rapidly changed.

The modification of the OPD described above may be performed based on Equation 21.

$$\text{if } IPD = 180^\circ \ \& CLD = 0,\ OPD = 0^\circ \quad \text{[Equation 21]}$$

$$\text{else}$$

$$OPD = \arctan\left(\frac{c_2\sin(IPD)}{c_1 + c_2\cos(IPD)}\right)$$

with $$c_1 = \sqrt{\frac{10^{\frac{CLD}{10}}}{1+10^{\frac{CLD}{10}}}},\ c_2 = \sqrt{\frac{1}{1+10^{\frac{CLD}{10}}}}$$

Additionally, according to another embodiment, the parameter modification unit 350 may modify the estimated OPD by filtering the estimated OPD, so that variation of the estimated OPD may be reduced.

For example, the parameter modification unit 350 may modify the estimated OPD using an Infinite Impulse Response (IIR) filter.

Furthermore, the parameter modification unit 350 may filter the estimated OPD, based on Equation 22.

$$\phi'_{frame,band} = \alpha\cdot\phi_{frame,band} + (1-\alpha)\cdot\phi_{frame-1,band} \quad \text{[Equation 22]}$$

Here, $\phi_{frame,band}$ denotes phase information associated with a signal included in a predetermined frequency band in a current frame, $\phi_{frame-1,band}$ denotes phase information associated with a signal included in a predetermined frequency band in a previous frame prior by one frame to the current frame, α denotes a real number greater than 0 and less than 1 and $\phi'_{frame,band}$ denotes filtered phase information of the signal included in the predetermined frequency band in the current frame.

In other words, the parameter modification unit 360 may assign a first weight α to $\phi_{frame,band}$, assign a second weight (1−α) to $\phi_{frame-1,band}$, add $\phi_{frame,band}$ and $\phi_{frame-1,band}$ to which the weights are assigned, and modify the OPD so that a variation of the estimated OPD may be reduced.

Additionally, whether to apply filtering to the estimated OPD may be determined in an encoding end. The encoding end may include, in a bitstream, filtering information regarding the filtering, and may transmit the bitstream including the filtering information to the decoding apparatus 300. The parameter modification unit 350 may determine whether to perform the filtering, based on the filtering information.

As described above with reference to FIG. 1, the encoding end may select a quantization type based on continuity of the phase information, and may generate a bitstream including a phase parameter quantized based on the selected quantization type, and quantization type information.

For example, when the decoding apparatus 300 receives the bitstream including the quantized phase parameter and the quantization type information, the parameter decoding unit 320 may restore, from the bitstream, the quantization type information and the quantized phase parameter (hereinafter, is referred to as a first phase parameter), may inverse-quantize the first phase parameter based on the restored quantization type information, and may compute a second phase parameter.

In this example, the up-mixing unit 340 may up-mix the mono signal, using the second phase parameter, and parameters other than the second phase parameter.

Accordingly, the decoding apparatus 300 may reduce degradation in the sound quality due to the quantization of the phase parameter and a discontinuous phase value caused by the quantization of the phase parameter.

Figure 4:
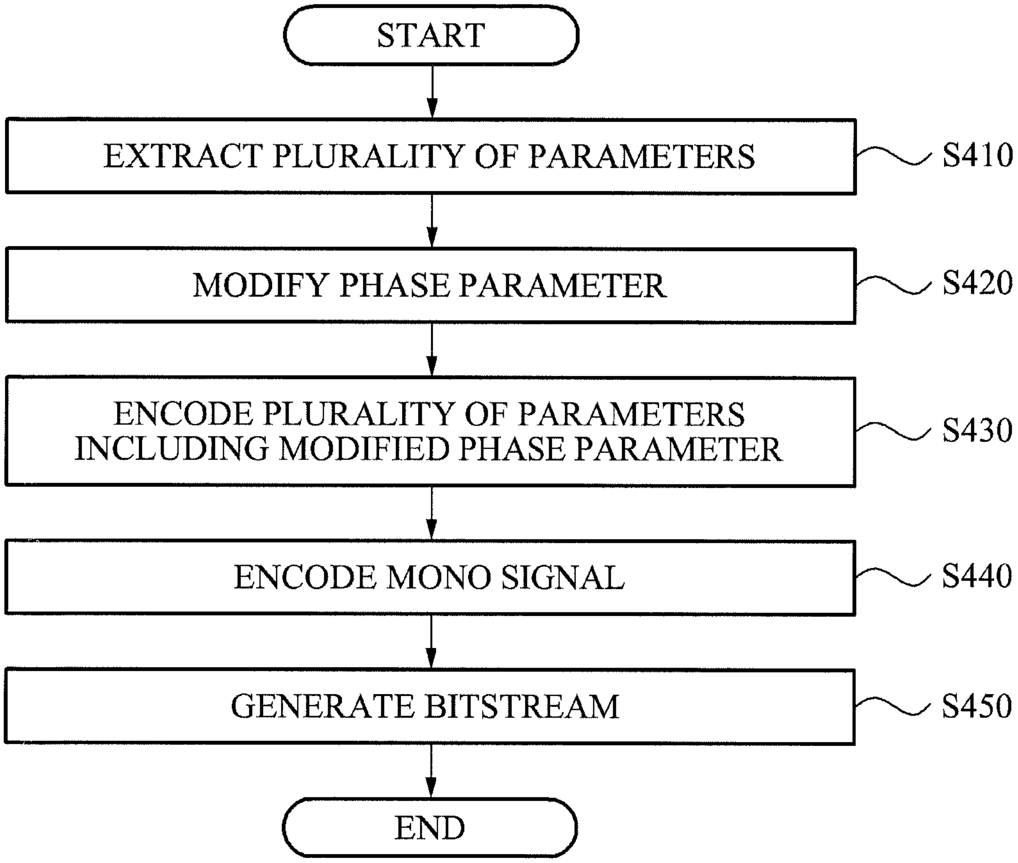
FIG. 4 is a flowchart illustrating a method of encoding a multi-channel signal; according to an embodiment.

FIG. 4 is a flowchart illustrating a method of encoding a multi-channel signal according to according to an embodiment.

Referring to FIG. 4, the method of encoding a multi-channel signal, hereinafter, referred to as an encoding method, may include operations processed by the encoding apparatus 100 of FIG. 1. Accordingly, descriptions about the encoding apparatus 100 described above with reference to FIG. 1 may also be applied to the encoding method according to an embodiment, although omitted here.

In operation S410, a plurality of parameters is extracted. The plurality of parameters may indicate a characteristic relation among a plurality of channels constituting a multi-channel signal.

In operation S420, a phase parameter associated with phase information between the plurality of channels among the plurality of parameters is modified.

According to an embodiment, the phase parameter may include an IPD.

Additionally, according to an embodiment, the plurality of parameters may include a CLD. In operation S410, when the CLD is 0 and the IPD is 180°, the IPD may be modified to 0°.

In operation S430, the plurality of parameters including the modified phase parameter are encoded.

In operation S440, a mono signal obtained by down-mixing the multi-channel signal is encoded.

Figure 5:
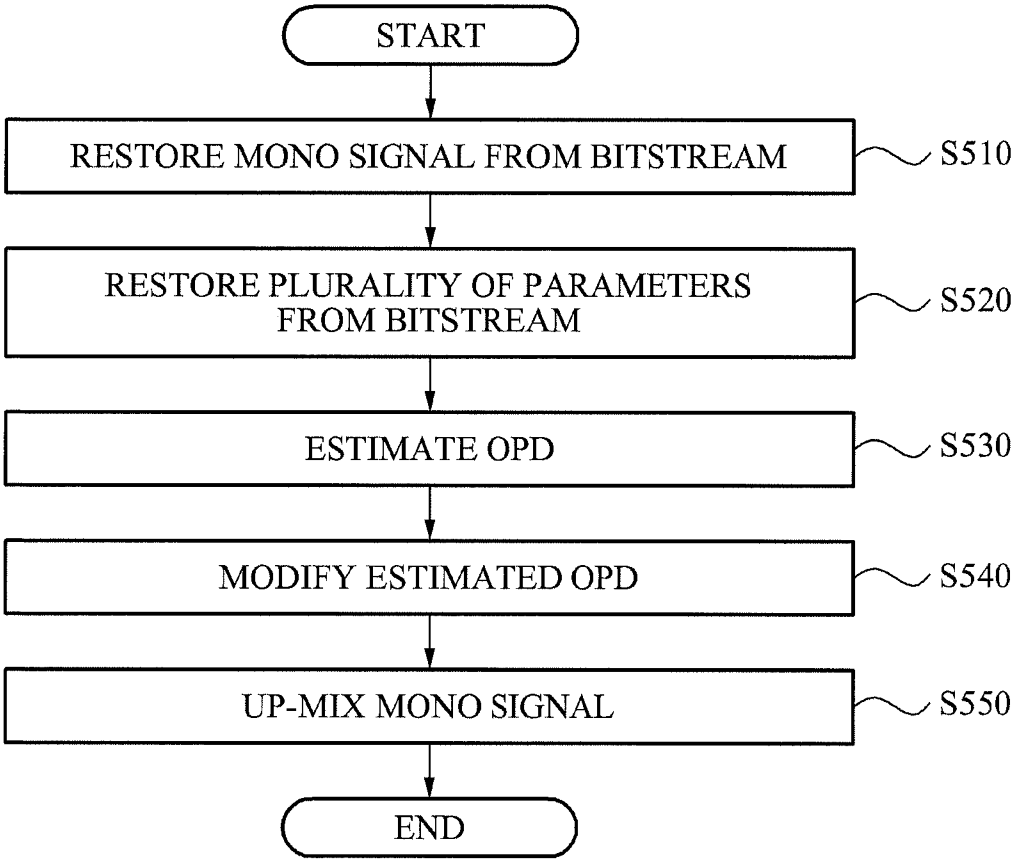
FIG. 5 is a flowchart illustrating a method of decoding a multi-channel signal according to an embodiment.

In operation S450, a bitstream where the multi-channel signal is encoded is generated using the encoded plurality of parameters and the encoded mono signal FIG. 5 is a flowchart illustrating a method of decoding a multi-channel signal according to an embodiment.

Referring to FIG. 5, the method of decoding a multi-channel signal, hereinafter, referred to as a decoding method, may include operations processed by the decoding apparatus 300 of FIG. 3. Accordingly, descriptions about the decoding apparatus 300 described above with reference to FIG. 3 may also be applied to the decoding method according to an embodiment, although omitted here.

In operation S510, a mono signal is restored from a bitstream where the multi-channel signal is encoded. Here, the mono signal may be a down-mix signal of the multi-channel signal.

In operation S520, a plurality of parameters are restored from the bitstream. The plurality of parameters may indicate a characteristic relation among a plurality of channels constituting the multi-channel signal.

In operation S530, an OPD is estimated using the restored plurality of parameters.

In operation S540, the estimated OPD is modified.

According to an embodiment, the plurality of parameters may include a CLD and an IPD. In operation S540, the OPD may be modified based on the CLD and the IPD.

For example, when the IPD is 180°, the OPD may be modified to 0° in operation S540. Additionally, when the IPD is not 180°, the OPD may be modified using the CLD in operation S540. The modified OPD may correspond to either a value between the restored OPD and 0°, or a value between the restored OPD and −180°.

According to another embodiment, in operation S540, the estimated OPD may be modified by filtering the estimated OPD, so that variation of the estimated OPD may be reduced. In operation S540, the estimated OPD may be filtered using an IIR filter.

In operation S550, the mono signal is up-mixed using the modified OPD and at least one restored parameter.

Referring back to FIG. 1, an encoding apparatus 100 for a multi-channel signal according to another embodiment may include only the parameter extraction unit 110, the down-mixing unit 130, the bitstream generation unit 150, and the parameter modification unit 160.

In the other embodiment, the multi-channel signal may include signals of a plurality of channels, and each of the plurality of channels included in the multi-channel signal may be referred to as a channel signal.

Additionally, for convenience of description, it may be assumed that the multi-channel signal input to the encoding apparatus 100 is a stereo signal including a left channel signal and a right channel signal. However, it is apparent to those skilled in the art that the encoding apparatus 100 according to the other embodiment may not be limited to encode the stereo signal, and may encode a multi-channel signal.

The parameter extraction unit 110 may extract a plurality of parameters indicating a characteristic relation between the left channel signal and right channel signal included in the stereo signal. The plurality of parameters may include a CLD, an ICC, an IPD, an OPD, and the like. Here, the IPD may be an example of a phase parameter associated with phase information between the left channel signal and the right channel signal. Additionally, the OPD may be an example of a phase parameter associated with phase information between a mono signal that will be described later and the left channel signal, or between the mono signal and the right channel signal.

The parameter modification unit 160 may modify a phase parameter associated with phase information between the plurality of channels among the plurality of parameters. Here, the plurality of parameters may include a CLD, and the parameter modification unit 160 may add a CLD offset to a value of the CLD, and may modify a parameter (namely, OPD) associated with a phase difference between the mono signal that will be described later and the plurality of channels.

Figure 6:
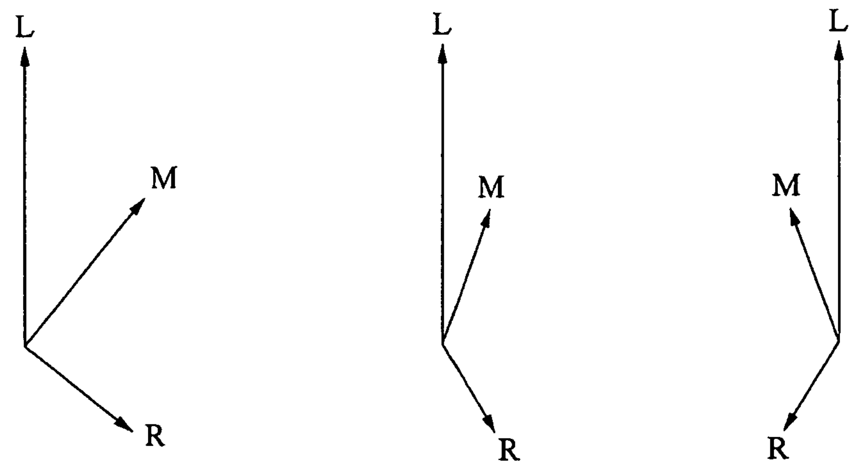
FIG. 6 is a diagram illustrating an example of generating a mono signal by estimating an Overall Phase Difference (OPD) and by down-mixing a stereo signal using a Channel Level Difference (CLD) offset.

For example, in the above-described Equation 21, the OPD may be modified by multiplying, by a value of the CLD offset, the second intermediate variable c1 or the third intermediate variable c2 that may be determined based on the value of the CLD. By adding the CLD offset, a phase of a mono signal, namely a down-mix signal of the stereo signal, may be determined. In other words, only when the OPD is calculated, a magnitude of the left channel signal or a magnitude of the right channel signal may be increased. This example may be represented as given in Equation 23 below. FIG. 6 illustrates an example of generating a mono signal by estimating an OPD and by down-mixing a stereo signal using a CLD offset. FIG. 6 shows an example in which a mono signal is generated by increasing a magnitude of a left channel signal. Here, the generation of the mono signal will be further described later.

Here, an IPD may be maintained at all times even when the CLD offset is added, and a slope of a phase trajectory may be determined based on the value of the CLD offset. Accordingly, phase discontinuity may be eliminated using the CLD offset, and it is possible to restore a down-mixing result without a distortion. During decoding, a down-mixed mono signal may be up-mixed by adding the CLD offset, and accordingly it is possible to eliminate the phase discontinuity. The decoding will be further described later.

As an example of the value of the CLD offset, a difference between neighboring frames may be set to be less than a phase quantization bin, based on an IPD of 180°, which indicates the largest difference. To set a difference between neighboring frames to be less than a phase quantization bin of 45° in coarse quantization, assuming that the CLD has a value of 1, the CLD offset may have a value of the square root of 2. Additionally, to set a difference between neighboring frames to be less than a phase quantization bin of 22.5° in fine quantization, assuming that the CLD has a value of 1, the CLD offset may have a value of 1.8477. These examples may be represented using Equation 23, as given in Equations 24 and 25.

[Equation 23]

$$OPD = \arctan\left(\frac{c_2\sin(IPD)}{c_1' + c_2\cos(IPD)}\right) \text{ with, }$$

$$c_1' = c_1 \cdot cldoffset$$

-continued $$\Delta = opd_{ipd=135°} - opd_{ipd=180°} = \arctan\left(\frac{\sin(135°)}{\text{cld\_offset}\cdot\frac{c_1}{c_2} + \cos(135°)}\right) \leq 45° \quad \text{[Equation 24]}$$

$$\Delta = opd_{ipd=157.5°} - opd_{ipd=180°} = \arctan\left(\frac{\sin(157.5°)}{\text{cld\_offset}\cdot\frac{c_1}{c_2} + \cos(157.5°)}\right) \leq 22.5° \quad \text{[Equation 25]}$$

Here, $opd_{ipd=180°}$ may have a value of 0.

Additionally, according to another embodiment, the parameter modification unit 160 may modify a value of the OPD to transform a phase at the moment when phase discontinuity appears, and thus it is possible to eliminate the phase discontinuity. When a difference between an OPD value of a current frame and an OPD value of a previous frame prior by one frame to the current frame is equal to or greater than a preset value, the parameter modification unit 160 may modify the OPD value of the current frame. For example, when the difference between the OPD value of the current frame and the OPD value of the previous frame prior by one frame to the current frame is equal to or greater than 90°, the parameter modification unit 160 may modify the value of the OPD by 180°, and thus it is possible to eliminate the phase discontinuity.

Figure 7:
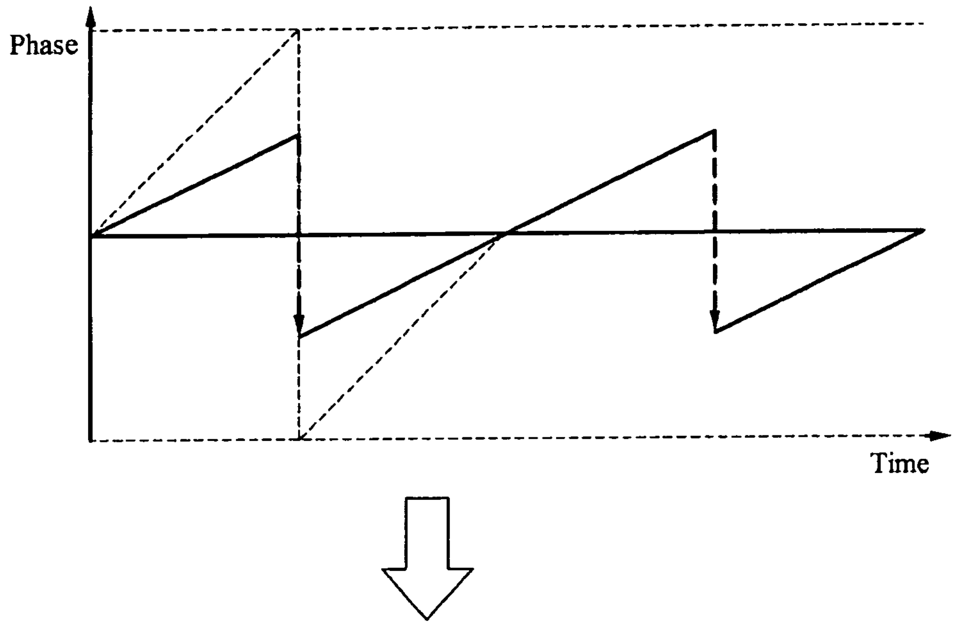
FIG. 7 is a diagram illustrating an example of transforming a phase of an OPD value.
Figure 7:
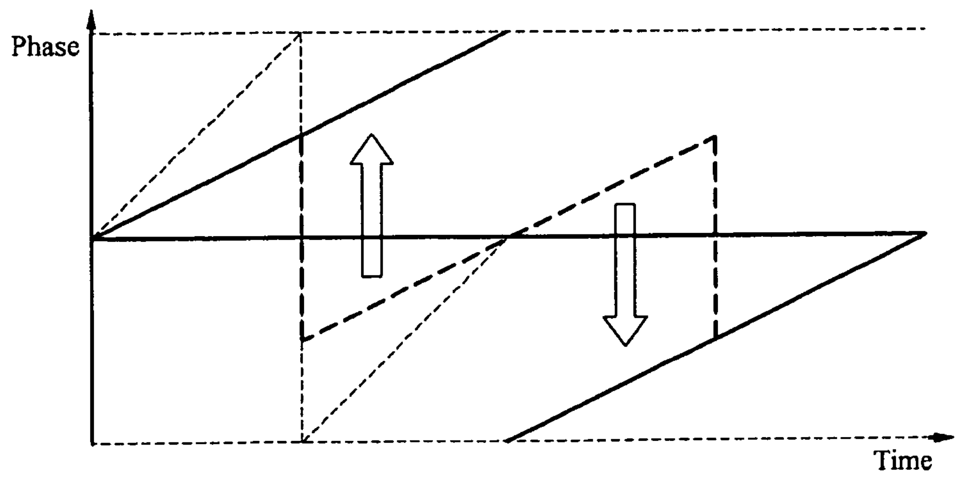

FIGS. 7(*a*) and 7(*b*) are diagrams illustrating an example of transforming a phase of an OPD value. In FIG. 7(*a*) and FIG. 7(*b*), an x-axis and a y-axis may respectively represent a time and a phase value. Specifically, when phase discontinuity of the OPD appears as illustrated in FIG. 7(*b*), the value of the OPD may be modified by 180°, so that the phase discontinuity may be eliminated. In FIG. 7(*b*) the first arrow and the second arrow may represent that the phase discontinuity is eliminated by the value of the OPD changed by modifying the value of the OPD by 180°. Here, to modify the value of the OPD by 180°, 180° (π) may be added or may be subtracted to the value of the OPD. The modification of the value of the OPD may be represented as given in Equation 26.

$$\text{if } |opd_{n-1} - opd_n| > \frac{\pi}{2}, \quad opd_n = \text{mod}(opd_n + \pi, 2\pi), \quad \text{where } n\text{: frame index} \quad \text{[Equation 26]}$$

The down-mixing unit 130 may down-mix the multi-channel signal using the modified phase parameter, and may generate a mono signal. Specifically, as indicated by a dotted arrow in FIG. 1 leading from the parameter modification unit 160 to the down-mixing unit 130, the modified phase parameter may be transmitted to the down-mixing unit 130, and the down-mixing unit 130 may down-mix the multi-channel signal using the phase parameter transferred through the parameter modification unit 160, and may generate a mono signal. Here, the down-mixing may enable generation of a mono signal of a single channel from stereo signals of at least two channels, and a bit amount of a bitstream generated during an encoding process may be reduced through the down-mixing. Here, the mono signal may be representative of the stereo signal. In other words, the encoding apparatus 100 may encode only the mono signal and transmit the encoded mono signal, instead of encoding each of a left channel signal and a right channel signal included in the stereo signal. For example, a magnitude of the mono signal may be obtained using an average magnitude of the left channel signal and the right channel signal, and a phase of the mono signal may be obtained using an average phase of the left channel signal and the right channel signal. Additionally, when the parameter is modified by the parameter modification unit 160, the magnitude of the left channel signal and the magnitude of the right channel signal, or the phase of the left channel signal and the phase of the right channel signal may be changed, and accordingly the magnitude and phase of the mono signal may also be changed. Additionally, according to another embodiment, the down-mixing unit 130 may shift the phase of the left channel signal and the phase of the right channel signal, based on the IPD and the OPD, and may represent the shifted phases as a sum of the two channel signals. Here, to adjust the magnitude of the mono signal, a gain value based on a CLD and an ICC may be used. This example may be represented as given in Equation 27. In this example, as indicated by a dotted arrow in FIG. 1 leading from the parameter extraction unit 110 to the down-mixing unit 130, the down-mixing unit 130 may receive an IPD, a CLD, and an ICC from the parameter extraction unit 110. In other words, the IPD, the CLD, and the ICC may be included in the plurality of parameters extracted by the parameter extraction unit 110.

$$m = g\cdot(L\cdot e^{-jOPD} + R\cdot e^{-j(OPD-IPD)}), \quad \text{with } g = \sqrt{\frac{CLD+1}{CLD+1+2\cdot ICC\cdot\sqrt{CLD}}} \quad \text{[Equation 27]}$$

The bitstream generation unit 150 may generate a bitstream by encoding the generated mono signal and the plurality of parameters other than the phase parameter. As an example, when the stereo signal is a voice signal, the mono signal may be encoded using a CELP scheme. As another example, when the stereo signal is a music signal, the mono signal may be encoded using a method similar to an existing MPEG-2/4 AAC or an mp3.

Here, the modified phase parameter may include an OPD that is a parameter associated with a phase difference between the mono signal and the plurality of channels. The OPD may be estimated from the other parameters and as a result, according to another embodiment, the bitstream generation unit 150 may encode only the CLD, the ICC, and the IPD among the extracted plurality of parameters, and may not encode the OPD. In other words, the encoding apparatus 100 according to another embodiment may reduce a bit amount of a transmitted bitstream, without encoding and transmitting the OPD. Estimation of the OPD will be further described with reference to the decoding apparatus 300 of FIG. 3.

Additionally, to reduce an amount of bits allocated during encoding of the plurality of parameters, the bitstream generation unit 150 may quantize the extracted plurality of parameters, and may encode the quantized plurality of parameters. When the bitstream generation unit 150 encodes only the CLD, the ICC, and the IPD, the bitstream generation unit 150 may quantize only the CLD, the ICC, and the IPD, and may encode the quantized CLD, the quantized ICC, and the quantized IPD.

As described above, to reduce an amount of bits to be transmitted, the encoding apparatus 100 may extract, from a stereo signal, a mono signal and a plurality of parameters, may encode the extracted mono signal and the extracted plurality of parameters, and may transmit the encoded mono signal and the encoded plurality of parameters. Additionally, to further reduce the amount of bits used for transmission of the plurality of parameters, the encoding apparatus 100 may encode only a CLD, an ICC, and an IPD, among the extracted plurality of parameters, excluding an OPD, and may transmit the encoded CLD, the encoded ICC, and the encoded IPD. Here, since the stereo signal itself is not encoded and transmitted, a sound quality of the stereo signal may be degraded when the stereo signal is played back. Accordingly, a mono signal may be generated by adding a CLD offset or modifying a value of the OPD, during calculating of the OPD, and thus it is possible to reduce the amount of bits, while eliminating phase discontinuity, thereby minimizing degradation in the sound quality.

Referring back to FIG. 3, a decoding apparatus 300 for a multi-channel signal according to another embodiment may include only the up-mixing unit 340, and the parameter modification unit 350. Hereinafter, functions for each of the above mentioned components will be described.

The parameter modification unit 350 may modify a parameter associated with a phase difference between a multi-channel signal and a mono signal that is a down-mix signal of the multi-channel signal. Here, the parameter associated with the phase difference may include an OPD estimated using a plurality of parameters indicating a characteristic relation among a plurality of channels constituting the multi-channel signal. The plurality of parameters may include a CLD representing an energy difference among the plurality of channels. The parameter modification unit 350 may modify the estimated OPD by adding a CLD offset to a value of the CLD.

Additionally, the multi-channel signal may include a plurality of frames. When a difference between an estimated OPD value of a current frame and an estimated OPD value of a previous frame prior by one frame to the current frame is equal to or greater than a preset value, the parameter modification unit 350 may modify the estimated OPD value of the current frame. For example, the preset value may include 90°. In this example, when the difference between the estimated OPD value of the current frame and the estimated OPD value of the previous frame prior by one frame to the current frame is equal to or greater than 90°, the parameter modification unit 350 may modify the OPD value of the current frame by 180°.

A method of modifying an OPD by adding a CLD offset or by a difference in OPD value between neighboring frames has been described above and accordingly, further description thereof will be omitted.

The up-mixing unit 340 may up-mix the mono signal using the modified parameter. Specifically, the up-mixing unit 340 may eliminate the phase discontinuity by up-mixing the mono signal using the modified OPD and thus, it is possible to minimize degradation in the sound quality. A method of up-mixing a mono signal has already been described in detail and accordingly, further description thereof will be omitted.

Here, the multi-channel signal may be received as an encoded bitstream from the encoding apparatus 100 described with reference to FIG. 1. The decoding apparatus 300 according to another embodiment may restore, from the bitstream, the mono signal and the plurality of parameters. As described above, the OPD, namely a parameter associated with a phase difference, may be estimated through the plurality of parameters. Accordingly, to obtain the mono signal from the bitstream and to estimate the OPD, the decoding apparatus 300 according to another embodiment may further include the mono signal decoding unit 310, the parameter decoding unit 320, and the parameter estimation unit 330. The mono signal decoding unit 310 may restore a mono signal from the bitstream where the multi-channel signal is encoded. The parameter decoding unit 320 may restore, from the bitstream, a plurality of parameters indicating a characteristic relation among a plurality of channels constituting the multi-channel signal. The parameter estimation unit 330 may estimate the OPD as a parameter associated with the phase difference, using the restored plurality of parameters.

Figure 8:
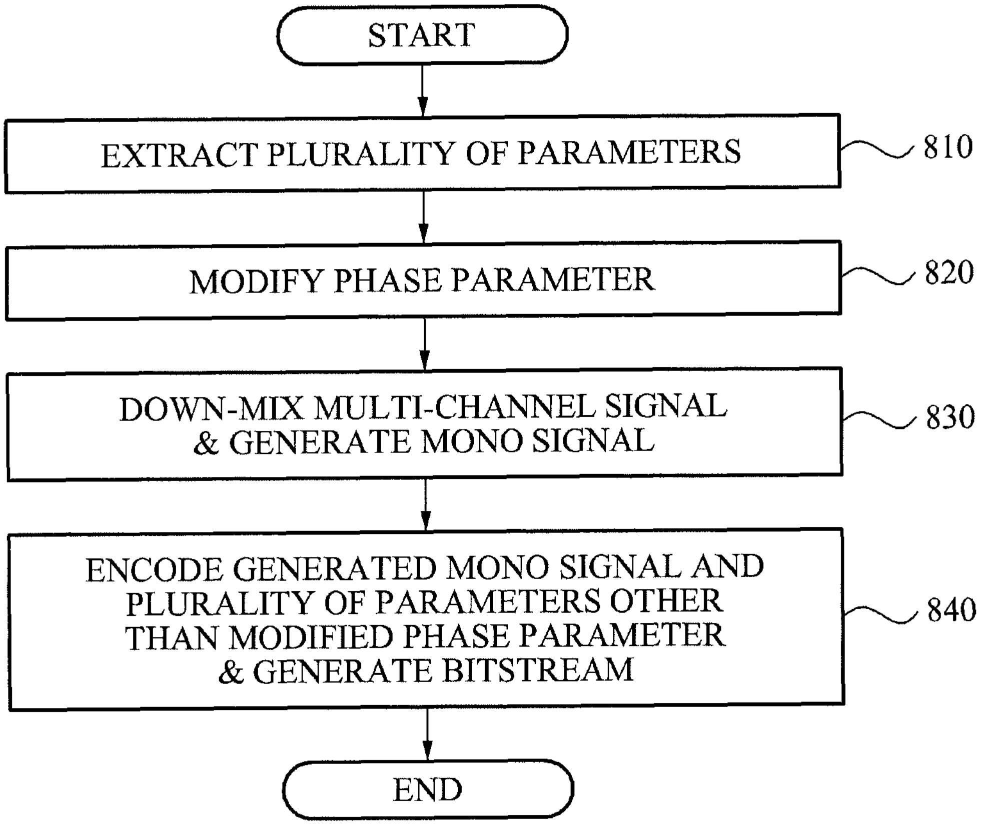
FIG. 8 is a flowchart illustrating a method of encoding a multi-channel signal according to another embodiment.

FIG. 8 is a flowchart illustrating an encoding method according to another embodiment. The encoding method may be performed by the above-described encoding apparatus 100 according to another embodiment. The encoding method of FIG. 8 will be described by describing operations performed by the encoding apparatus 100.

Here, the multi-channel signal may signify signals of a plurality of channels, and each of the plurality of channels included in the multi-channel signal may be referred to as a channel signal.

Additionally, for convenience of description, it may be assumed that the multi-channel signal input to the encoding apparatus 100 is a stereo signal including a left channel signal and a right channel signal. However, it is apparent to those skilled in the art that the encoding apparatus 100 according to another embodiment may not be limited to encode the stereo signal, and may encode a multi-channel signal.

In operation 810, the encoding apparatus 100 extracts a plurality of parameters that indicates a characteristic relation between a left channel signal and a right channel signal that form a stereo signal. The plurality of parameters may include a CLD, an ICC, an IPD, an OPD, and the like, as described above. The IPD may be an example of a phase parameter associated with phase information between the left channel signal and the right channel signal. Additionally, the OPD may be an example of a phase parameter associated with phase information between a mono signal that will be described later and the left channel signal, or between the mono signal and the right channel signal.

In operation 820, the encoding apparatus 100 modifies a phase parameter associated with phase information between the plurality of channels, among the plurality of parameters. Here, the plurality of parameters may include a CLD, namely a parameter of an energy difference among the plurality of channels. The encoding apparatus 100 may add a CLD offset to a value of the CLD, and may modify an OPD, namely, a parameter of a phase difference between the mono signal that will be described later and the plurality of channels.

For example, in the above-described Equation 21, the OPD may be modified by multiplying, by a value of the CLD offset, the second intermediate variable $c_1$ or the third intermediate variable $c_2$ that may be determined based on the value of the CLD. By adding the CLD offset, a phase of a mono signal, namely a down-mix signal of the stereo signal, may be determined. In other words, only when the OPD is calculated, a magnitude of the left channel signal or a magnitude of the right channel signal may be increased. This example may be represented as given in Equation 23. A method of generating a mono signal by estimating an OPD and by down-mixing a stereo signal using a CLD offset may be described with reference to FIG. 6. Here, the generation of the mono signal will be further described later.

Here, an IPD may be maintained at all times even when the CLD offset is added, and a slope of a phase trajectory may be determined based on the value of the CLD offset. Accordingly, phase discontinuity may be eliminated using the CLD offset, and it is possible to restore a down-mixing result without a distortion. During decoding, a down-mixed mono signal may be up-mixed by adding the CLD offset, and accordingly it is possible to eliminate the phase discontinuity. The decoding will be further described later.

As an example of the value of the CLD offset, a difference between neighboring frames may be set to be less than a phase quantization bin, based on an IPD of 180° that indicates the largest difference. To set a difference between neighboring frames to be less than a phase quantization bin of 45° in coarse quantization, assuming that the CLD has a value of 1, the CLD offset may have a value of the square root of 2. Additionally, to set a difference between neighboring frames to be less than a phase quantization bin of 22.5° in fine quantization, assuming that the CLD has a value of 1, the CLD offset may have a value of 1.8477. These examples may be represented, as given in the above-described Equations 24 and 25.

Additionally, according to another embodiment, the encoding apparatus 100 may modify a value of the OPD to transform a phase at the moment when phase discontinuity appears, and thus it is possible to eliminate the phase discontinuity. When a difference between an OPD value of a current frame and an OPD value of a previous frame prior by one frame to the current frame is equal to or greater than a preset value, the encoding apparatus 100 may modify the OPD value of the current frame. For example, when the difference between the OPD value of the current frame and the OPD value of the previous frame prior by one frame to the current frame is equal to or greater than 90°, the encoding apparatus 100 may modify the value of the OPD by 180°, and thus it is possible to eliminate the phase discontinuity. An example of transforming the phase may be described with reference to FIG. 7 and the above-described Equation 26.

In operation 830, the encoding apparatus 100 down-mixes the multi-channel signal using the modified phase parameter, and generates a mono signal. Here, the down-mixing may enable generation of a mono signal of a single channel from stereo signals of at least two channels, and a bit amount of a bitstream generated during an encoding process may be reduced through the down-mixing. In this instance, the mono signal may be representative of the stereo signal. In other words, the encoding apparatus 100 may encode only the mono signal and transmit the encoded mono signal, instead of encoding each of a left channel signal and a right channel signal included in the stereo signal. For example, a magnitude of the mono signal may be obtained using an average magnitude of the left channel signal and the right channel signal, and a phase of the mono signal may be obtained using an average phase of the left channel signal and the right channel signal. Additionally, when the parameter is modified by the encoding apparatus 100, the magnitude of the left channel signal and the magnitude of the right channel signal, or the phase of the left channel signal and the phase of the right channel signal may be changed, and accordingly the magnitude and phase of the mono signal may also be changed. Additionally, according to another embodiment, the encoding apparatus 100 may shift the phase of the left channel signal and the phase of the right channel signal, based on the IPD and the OPD, and may represent the shifted phases as a sum of the two channel signals. Here, to adjust the magnitude of the mono signal, a gain value based on a CLD and an ICC may be used. This example may be represented as given in the above-described Equation 27.

In operation 840, the encoding apparatus 100 encodes the generated mono signal, and the plurality of parameters other than the modified phase parameter, and generates a bitstream. As an example, when the stereo signal is a voice signal, the mono signal may be encoded using a CELP scheme. As another example, when the stereo signal is a music signal, the mono signal may be encoded using a method similar to an existing MPEG-2/4 AAC or an mp3.

Here, the modified phase parameter may include an OPD that is a parameter associated with a phase difference between the mono signal and the plurality of channels. The OPD may be estimated from the other parameters and accordingly, according to another embodiment, the encoding apparatus 100 may encode only the CLD, the ICC, and the IPD among the extracted plurality of parameters, and may not encode the OPD. In other words, the encoding apparatus 100 according to another embodiment may reduce a bit amount of a transmitted bitstream, without encoding and transmitting the OPD. Further descriptions of estimation of the OPD may be given with reference to the decoding apparatus 300 of FIG. 3.

Additionally, to reduce an amount of bits allocated during encoding of the plurality of parameters, the encoding apparatus 100 may quantize the extracted plurality of parameters, and may encode the quantized plurality of parameters. When the encoding apparatus 100 encodes only the CLD, the ICC, and the IPD, the encoding apparatus 100 may quantize only the CLD, the ICC, and the IPD, and may encode the quantized CLD, the quantized ICC, and the quantized IPD.

As described above, to reduce an amount of bits to be transmitted, the encoding apparatus 100 may extract, from a stereo signal, a mono signal and a plurality of parameters, may encode the extracted mono signal and the extracted plurality of parameters, and may transmit the encoded mono signal and the encoded plurality of parameters. Additionally, to further reduce the amount of bits used for transmission of the plurality of parameters, the encoding apparatus 100 may encode only a CLD, an ICC, and an IPD, among the extracted plurality of parameters, excluding an OPD, and may transmit the encoded CLD, the encoded ICC, and the encoded IPD. Here, since the stereo signal itself is not encoded and transmitted, a sound quality of the stereo signal may be degraded when the stereo signal is played back. Accordingly, a mono signal may be generated by adding a CLD offset or modifying a value of the OPD, during calculating of the OPD, and thus it is possible to reduce the amount of bits. while eliminating phase discontinuity, thereby minimizing degradation in the sound quality.

Figure 9:
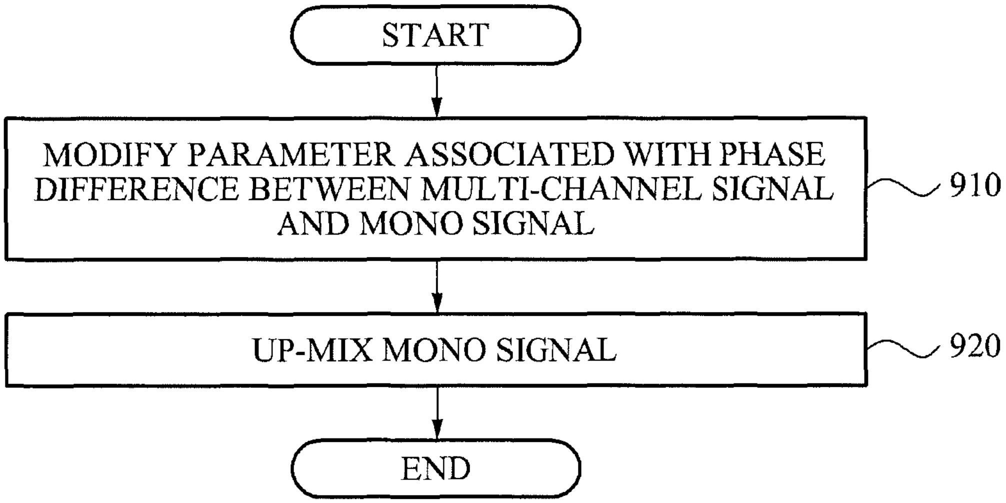
FIG. 9 is a flowchart illustrating a method of decoding a multi-channel signal according to another embodiment.

FIG. 9 is a flowchart illustrating a decoding method according to another embodiment. The decoding method may be performed by the above-described decoding apparatus 300 according to another embodiment. The decoding method of FIG. 9 will be described by describing operations performed by the decoding apparatus 300.

In operation 910, the decoding apparatus 300 modifies a parameter associated with a phase difference between a multi-channel signal and a mono signal that is a down-mix signal of the multi-channel signal. Here, the parameter associated with the phase difference may include an OPD estimated using a plurality of parameters indicating a characteristic relation among a plurality of channels constituting the multi-channel signal. The plurality of parameters may include a CLD signifying an energy difference among the plurality of channels. The decoding apparatus 300 may modify the estimated OPD by adding a CLD offset to a value of the CLD.

Additionally, the multi-channel signal may include a plurality of frames. When a difference between an estimated OPD value of a current frame and an estimated OPD value of a previous frame prior by one frame to the current frame is equal to or greater than a preset value, the parameter modification unit 350 may modify the estimated OPD value of the current frame. For example, the preset value may include 90°. In this example, when the difference between the estimated OPD value of the current frame and the estimated OPD value of the previous frame prior by one frame to the current frame is equal to or greater than 90°, the decoding apparatus 300 may modify the OPD value of the current frame by 180°.

The method of modifying an OPD by adding a CLD offset or by a difference in OPD value between neighboring frames has been described above and accordingly, further description thereof will be omitted.

The decoding apparatus 300 may up-mix the mono signal using the modified parameter. Specifically, the decoding apparatus 300 may eliminate the phase discontinuity by up-mixing the mono signal using the modified OPD and thus, it is possible to minimize degradation in the sound quality. The method of up-mixing a mono signal has already been described in detail and accordingly, further description thereof will be omitted.

Here, the multi-channel signal may be received as an encoded bitstream from the encoding apparatus 100 according to another embodiment described with reference to FIG. 1. The decoding apparatus 300 according to another embodiment may restore, from the bitstream, the mono signal and the plurality of parameters. As described above, the OPD, namely a parameter associated with a phase difference, may be estimated through the plurality of parameters. Accordingly, to obtain the mono signal from the bitstream and to estimate the OPD, the decoding apparatus 300 according to another embodiment may further perform restoring a mono signal from the bitstream where the multi-channel signal is encoded, restoring, from the bitstream, a plurality of parameters indicating a characteristic relation among a plurality of channels constituting the multi-channel signal, and estimating the OPD as a parameter associated with the phase difference, using the restored plurality of parameters, although not illustrated.

As described above, according to embodiments, it is possible to reduce an amount of data required during data transmission, and to provide a multi-channel audio signal with an improved sound quality.

The above-described embodiments may be recorded, stored, or fixed in one or more computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Moreover, the encoding apparatus 100 shown in FIG. 1 may include one or more processors to execute at least one of the above-described units and methods. In addition, the decoding apparatus 300 shown in FIG. 3 may include one or more processors to execute at least one of the above-described units and methods. Further, the communication between the encoding apparatus 100 and the decoding apparatus 300 may be through a wired or a wireless network, or through other communication channels such as telephony, for example.

Further, according to an aspect of the embodiments, any combinations of the described features, functions and/or operations can be provided.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. A decoding method of generating a stereo signal from a down-mixed mono signal received in a bitstream, comprising:

estimating an Overall Phase Difference (OPD) parameter representing a phase difference between one of a left signal and a right signal and the down-mixed mono signal based on parameters received in the bitstream that represent characteristic relations between channels, the parameters received in the bitstream including an Inter-channel Phase Difference (IPD) parameter and a Channel Level Differences (CLD) parameter;

up-mixing, using at least one processing device, the down-mixed mono signal based on the estimated OPD parameter and the parameters received in the bitstream, wherein the estimating of the OPD parameter includes estimating the OPD parameter to be zero upon the IPD parameter being determined to be 180° and the CLD parameter being determined to be 0, wherein the up-mixing up-mixes the down-mixed mono signal based on the estimated OPD parameter.

2. The decoding method of claim 1 further comprising:

decoding the down-mixed mono signal from the bitstream; and decoding the parameters received in the bitstream.

3. The decoding method of claim 1, wherein the OPD parameter is estimated based on the IPD parameter being applied to a trigonometric function upon a phase of two channels being determined to not be out of phase or levels of the two channels being determined to not be equal.

4. The decoding method of claim 1, wherein the OPD parameter is estimated based on linear interpolation between phase information of a currently received frame from the bitstream and estimated phase information of a previously received frame from the bitstream.

5. The decoding method of claim 1, wherein the bitstream is generated by an encoder configured to selectively encode the bitstream to not include the OPD parameter and the parameters received in the bitstream do not include the OPD parameter.

6. The decoding method of claim 5, further comprising estimating the OPD parameter, used to up-mix the down-mixed mono signal, to be zero upon a phase of two channels being determined to be out of phase and levels of the two channels being determined to be equal, wherein the up-mixing up-mixes the down-mixed mono signal based on the estimated OPD parameter.

7. The decoding method of claim 1, wherein the estimating of the OPD parameter is performed so that the estimated OPD parameter is used for efficiently representing phase information of the down-mixed mono signal in the bitstream.

8. A decoding method of generating a stereo signal from a down-mixed mono signal received in a bitstream, comprising:

estimating an Overall Phase Difference (OPD) parameter representing a phase difference between one of a left signal and a right signal and the down-mixed mono signal based on parameters received in the bitstream that represent characteristic relations between channels; and up-mixing, using at least one processing device, the down-mixed mono signal based on the estimated OPD parameter and the parameters received in the bitstream, wherein the parameters received in the bitstream include an Inter-channel Phase Difference (IPD) parameter, and wherein the estimating of the OPD parameter includes estimating the OPD parameter to be zero upon a phase of two channels being determined to be out of phase and levels of the two channels being determined to be equal, wherein the up-mixing up-mixes the down-mixed mono signal based on the estimated OPD parameter.

9. The decoding method of claim 8, wherein the OPD parameter is estimated based on the IPD parameter being applied to a trigonometric function upon the phase of the two channels being determined to not be out of phase or levels of the two channels being determined to not be equal.

10. The decoding method of claim 8, wherein the OPD parameter is estimated based on linear interpolation between phase information of a currently received frame from the bitstream and estimated phase information of a previously received frame from the bitstream.

11. The decoding method of claim 8, wherein the estimating of the OPD parameter is performed so that the estimated OPD parameter is used for efficiently representing phase information of the down-mixed mono signal in the bitstream.

12. A decoding apparatus, including at least one processing device, to generate a stereo signal from a down-mixed mono signal received in a bitstream, comprising:

a parameter estimation unit to estimate an Overall Phase Difference (OPD) parameter representing a phase difference between one of a left signal and a right signal and the down-mixed mono signal based on parameters received in the bitstream that represent characteristic relations between channels, the parameters received in the bitstream including an Inter-channel Phase Difference (IPD) parameter and a Channel Level Differences (CLD) parameter; and an up-mixing unit to up-mix the down-mixed mono signal based on the estimated OPD parameter and the parameters received in the bitstream, wherein the parameter estimation unit estimates the OPD parameter to be zero upon the IPD parameter being determined to be 180° and the CLD parameter being determined to be 0, wherein the up-mixing unit up-mixes the down-mixed mono signal based on the estimated OPD parameter.

13. The decoding apparatus of claim 12, wherein the parameter estimation unit estimates the OPD parameter based on the IPD parameter being applied to a trigonometric function upon a phase of two channels being determined to not be out of phase or levels of the two channels being determined to not be equal.

14. The decoding apparatus of claim 12, wherein the parameter estimation unit estimates the OPD parameter based on linear interpolation between phase information of a current frame received by the decoding apparatus and estimated phase information of a previous frame received by the decoding apparatus.

15. The decoding apparatus of claim 12 further comprising:

a mono signal decoding unit to decode the down-mixed mono signal from the bitstream; and a parameter decoding unit to decode the parameters received in the bitstream.

16. The decoding apparatus of claim 12, wherein the bitstream is generated by an encoder configured to selectively encode the bitstream to not include the OPD parameter and the parameters received in the bitstream do not include the OPD parameter.

17. The decoding apparatus of claim 12, wherein the estimating of the OPD parameter is performed so that the estimated OPD parameter is used for efficiently representing phase information of the down-mixed mono signal in the bitstream.

18. A decoding apparatus, including at least one processing device, for generating a stereo signal using a phase parameter, comprising:

a parameter estimation unit to estimate an Overall Phase Difference (OPD) parameter representing a phase difference between one of a left signal and a right signal and a down-mixed mono signal based on parameters received in a bitstream that represent characteristic relations between channels;

an up-mixing unit to up-mix the down-mixed mono signal using the estimated OPD parameter and the parameters received in the bitstream;

a mono signal decoding unit to decode the down-mixed mono signal from the bitstream; and a parameter decoding unit to decode the parameters received in the bitstream, including decoding an Inter-channel Phase Difference (IPD) parameter and a Channel Level Differences (CLD) parameter received in the bitstream, wherein the parameter estimation unit estimates the OPD parameter to be zero upon the IPD parameter being determined to be 180° and the CLD parameter being determined to be 0, wherein the up-mixing unit up-mixes the down-mixed mono signal based on the estimated OPD parameter.

19. The decoding apparatus of claim 18, wherein the estimating of the OPD parameter is performed so that the estimated OPD parameter is used for efficiently representing phase information of the down-mixed mono signal in the bitstream.

20. A decoding apparatus, including at least one processing device, to generate a stereo signal from a down-mixed mono signal received in a bitstream, comprising:

a parameter estimation unit to estimate an Overall Phase Difference (OPD) parameter representing a phase difference between one of a left signal and a right signal and the down-mixed mono signal based on parameters received in the bitstream that represent characteristic relations between channels; and an up-mixing unit to up-mix the down-mixed mono signal based on the estimated OPD parameter and the parameters received in the bitstream, wherein the parameters received in the bitstream include an Inter-channel Phase Difference (IPD) parameter, wherein the parameter estimation unit estimates the OPD parameter to be zero upon a phase of two channels being determined to be out of phase and levels of the two channels being determined to be equal, wherein the up-mixing unit up-mixes the down-mixed mono signal based on the estimated OPD parameter.

21. The decoding apparatus of claim 20, wherein the estimating of the OPD parameter is performed so that the estimated OPD parameter is used for efficiently representing phase information of the down-mixed mono signal in the bitstream.

22. The decoding apparatus of claim 20, wherein the parameter estimation unit estimates the OPD parameter based on the IPD parameter being applied to a trigonometric function upon the phase of the two channels being determined to not be out of phase or levels of the two channels being determined to not be equal.

23. The decoding apparatus of claim 20, wherein the parameter estimation unit estimates the OPD parameter based on linear interpolation between phase information of a current frame received by the decoding apparatus and estimated phase information of a previous frame received by the decoding apparatus.

* * * * *